(12) United States Patent
Zhao et al.

(10) Patent No.: US 6,991,257 B2
(45) Date of Patent: Jan. 31, 2006

(54) SIDE AIRBAG FOR A VEHICLE

(75) Inventors: David Zhao, Northville, MI (US); Leonard Anthony Shaner, New Baltimore, MI (US); Nial James Wykes, Troy, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 10/604,903

(22) Filed: Aug. 26, 2003

(65) Prior Publication Data

US 2005/0173900 A1    Aug. 11, 2005

Related U.S. Application Data

(60) Provisional application No. 60/461,927, filed on Mar. 14, 2003.

(51) Int. Cl.
*B60R 21/22* (2006.01)

(52) U.S. Cl. .................................... 280/730.2

(58) Field of Classification Search ............. 280/730.2, 280/730.1, 743.1, 743.2
See application file for complete search history.

(56) References Cited

U.S. PATENT DOCUMENTS

| | | | | |
|---|---|---|---|---|
| 5,324,072 A | * | 6/1994 | Olson et al. | 280/730.2 |
| 5,586,782 A | * | 12/1996 | Zimmerman et al. | 280/730.2 |
| 5,730,464 A | * | 3/1998 | Hill | 280/743.2 |
| 5,797,621 A | * | 8/1998 | Ono | 280/730.2 |
| 5,890,732 A | * | 4/1999 | Nakamura et al. | 280/729 |

* cited by examiner

*Primary Examiner*—Faye M. Fleming

(74) *Attorney, Agent, or Firm*—Frank A. MacKenzie

(57) ABSTRACT

A side airbag (14) for a supplemental restraint system (12) of a vehicle (10) includes an inflatable bag comprised of a shoulder-receiving portion (24) and a thorax-receiving portion (26) that extends from the shoulder-receiving portion (24). This airbag (14) is moveable between a deflated configuration and an inflated configuration. In the inflated configuration, the thorax-receiving portion (26) is sized thinner than the shoulder-receiving portion (24) in a lateral direction.

20 Claims, 5 Drawing Sheets

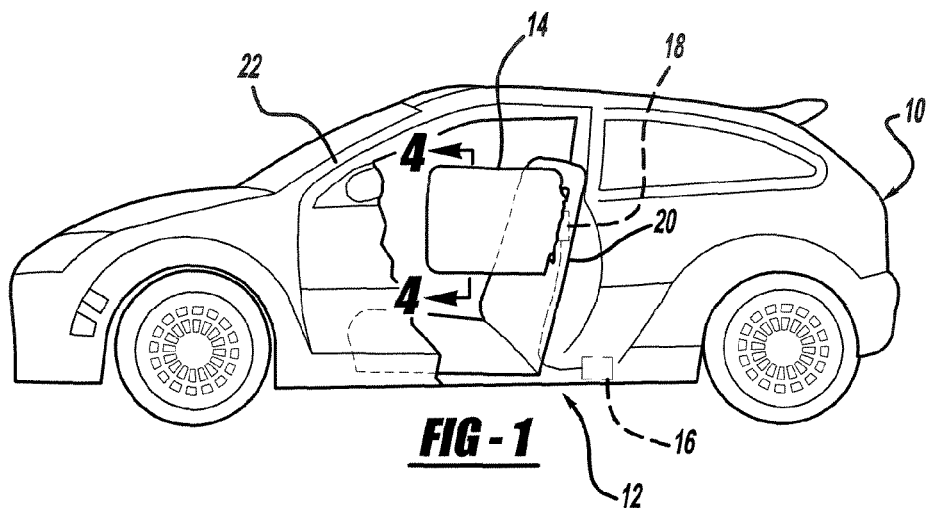
FIG - 1
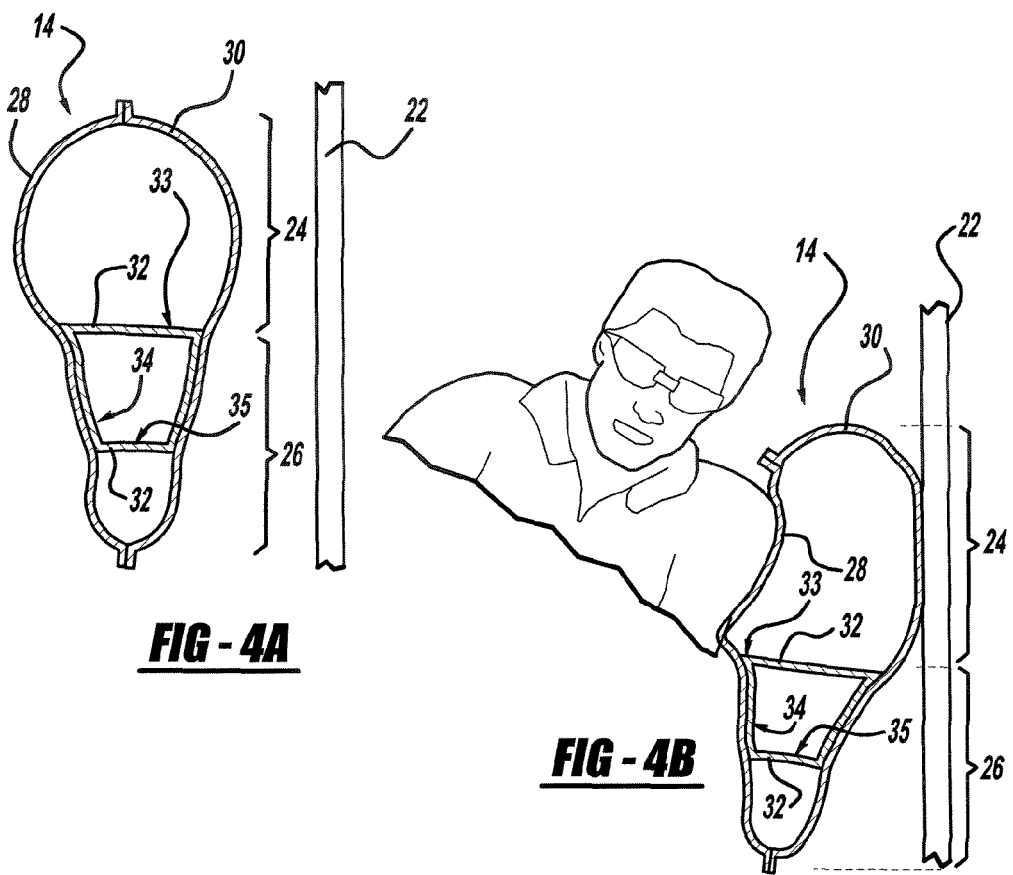
FIG - 4A
FIG - 4B

SIDE AIRBAG FOR A VEHICLE

CROSS REFERENCE TO RELATED APPLICATIONS

The present invention claims priority to U.S. Provisional Application No. 60/461,927, filed Mar. 14, 2003, entitled "COMPACTIBLE SIDE AIRBAG SHAPE FOR OCCUPANT PROTECTION", the disclosure of which is incorporated by reference herein.

BACKGROUND OF INVENTION

The present invention relates generally to supplemental restraint systems for protecting occupants of vehicles, and more particularly to a supplemental restraint system having a side airbag with a construction that improves the safety of the occupants.

Supplemental restraint systems (SRS) in vehicles are well known. A typical SRS includes one or more crash sensors and one or more airbags that are deployed when the crash sensors detect a vehicle impact event. Specifically, the crash sensors detect a vehicle impact event as defined by a series of predetermined parameters, e.g. a threshold G level. During this event, the SRS usually causes one or more of the airbags to suddenly inflate. Typically, the system holds gas within the airbag for a predetermined amount of time and then permits the gas to be forced out of the airbag. The occupant can force gas out of the inflated airbag when he is forced onto the airbag. As a result, the airbag can absorb a portion of the energy associated with the impact and decrease the risk of injury to the occupant.

Conventional side airbag construction typically includes an upper portion in open communication with a lower portion. The upper portion typically is intended to protect the occupant's shoulders while the lower portion ordinarily is utilized for protecting the occupant's ribs and remaining thorax region. This construction typically has a constant thickness from the upper portion to the lower portion. As is known, the pressure within the airbag remains relatively constant throughout the airbag. For this reason, the upper portion and the lower portion apply the same amount of pressure to the occupant's shoulders and ribs.

A drawback of existing side airbags is that its uniform thickness may not adequately protect the occupant. Specifically, during the initial stages of a side impact event, the occupant's shoulder can be pressed laterally into the side airbag so as to force gas from the upper portion of the airbag into the lower portion of the airbag. As a result, the lower portion can be momentarily inflated thicker than the upper portion and contact the occupant's ribs. It is understood that the occupant's shoulder can withstand a substantially stronger blow without injury than the ribs can. For this reason, the lower portion may inflate outward and deflect the occupant's weaker ribs toward the center of the vehicle. Such a result can produce a substantial amount of spine shear and possibly injure the occupant.

One proposed solution requires that the overall bag pressure is decreased by utilizing a lower-powered inflation device. However, the decreased airbag pressure may allow the upper portion of the airbag to become completely collapsed thereby allowing the occupant's shoulder to be contacted by door intrusion. As a result, the door intrusion can cause excessive shoulder deflection and possibly injure the occupant.

Therefore, a need exists for a side airbag having a construction that sufficiently decreases the risk of injury to the occupant.

SUMMARY OF INVENTION

The present invention provides a side airbag for a supplemental restraint system of a vehicle. The side airbag is an inflatable bag comprised of a shoulder-receiving portion and a thorax-receiving portion that extends from the shoulder-receiving portion. This airbag is moveable between a deflated configuration and an inflated configuration. In the inflated configuration, the thorax-receiving portion is sized thinner than the shoulder-receiving portion in a lateral direction.

One advantage of the present invention is that a side airbag is provided that distributes a greater portion of the vehicle impact energy to an occupant's shoulders instead of the occupant's weaker, more injury-prone thorax.

Another advantage of the present invention is that a side airbag is provided that can be readily implemented with existing supplemental restrain systems.

Yet another advantage of the present invention is that a side airbag is provided that has a simple construction which can require substantially low manufacturing costs.

Other advantages of the present invention will become apparent upon considering the following detailed description and appended claims, and upon reference to the accompanying drawings.

BRIEF DESCRIPTION OF DRAWINGS

For a more complete understanding of this invention, reference should now be made to the embodiments illustrated in greater detail in the accompanying drawings and described below by way of the examples of the invention:

FIG. 1 is a partially cutaway side view of an automotive vehicle having a supplemental restraint system with an inflated side airbag integrated therein, according to one embodiment of the present invention.

FIGS. 4A–4B are cross-sectional views of an inflated side airbag, illustrating the deformation of the side airbag during a side impact event, according to one embodiment of the present invention.

FIG. 5C is a partially cutaway bottom view of the inflated side airbag shown in FIG. 5A; and.

DETAILED DESCRIPTION

Figure 2A:
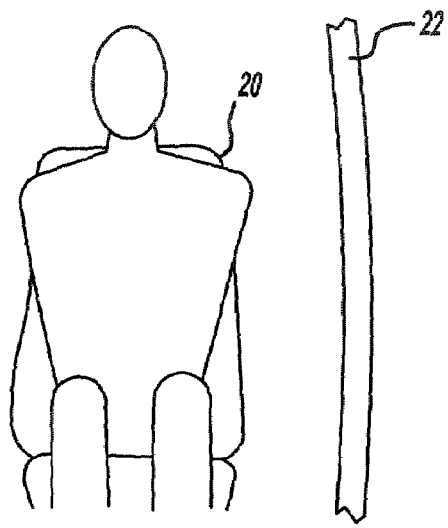
FIGS. 2A–2D are schematic views of an occupant within an automotive vehicle, illustrating a side airbag deployment sequence, according to one embodiment of the present invention.
Figure 2B:
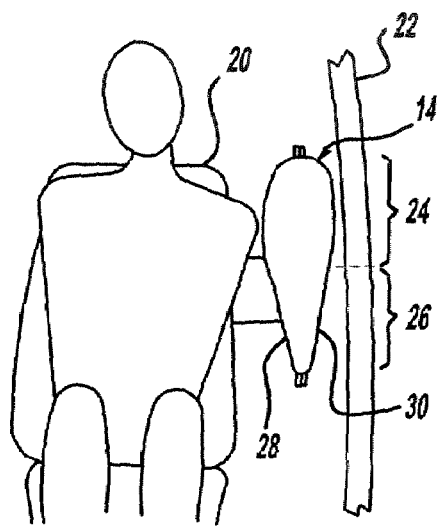
Figure 2C:
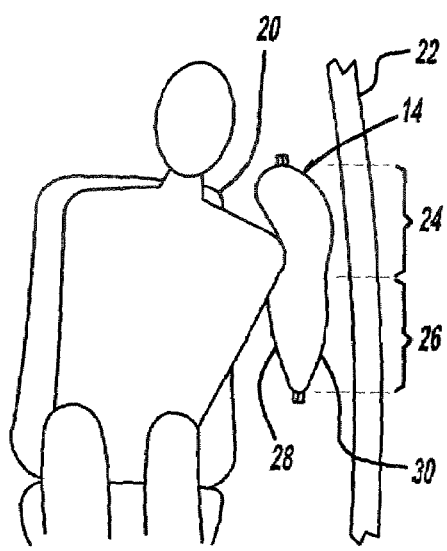
Figure 2D:
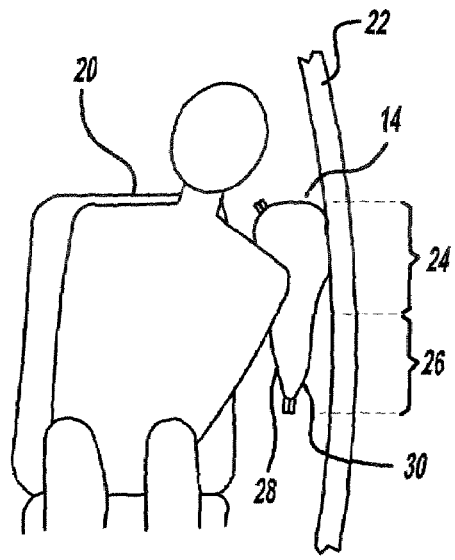

In the following figures, the same reference numerals are used to identify the same components in the various views.

The present invention is particularly suited for a supplemental restraint system, which utilizes a side airbag for decreasing the risk of injuries to occupants during a side impact event. In this regard, the embodiments described herein employ structural features where the context permits. However, it is understood that a variety of other embodiments without the described features are contemplated as well. For this reason, it follows that the invention can be carried out in various other modes and utilized for other suitable applications as desired.

Referring to FIG. 1, there is shown a side view of an automotive vehicle 10 having a supplemental restraint system (SRS) 12 with a deployed side airbag 14, according to one embodiment of the invention. In this embodiment, the SRS 12 includes a crash sensor 16 for detecting a vehicle impact event, e.g. a side impact event. However, it will be appreciated that the crash sensor 16 can instead detect various other impact events, e.g. a front-end crash event.

Furthermore, in this embodiment, the crash sensor 16 is an accelerometer integrated within a microchip. This accelerometer is utilized for closing a mechanical switch when the accelerometer is subjected to a minimum lateral pulse. For example, the accelerometer may cause the mechanical switch to close when a crash test barrier of a predetermined mass strikes the side of a vehicle at minimum speed of approximately 10 mph. In this respect, the accelerometer closes a switch within the crash sensor 16 and allows the crash sensor 16 to detect the side impact event.

The crash sensor 16 is electronically coupled to an inflation device 18 for sending an electrical signal to the inflation device 18 when the switch is closed. In this regard, the crash sensor 16 actuates the inflation device 18 during the side impact event. This inflation device 18 includes a solid propellant, e.g. a mixture of sodium azide and potassium nitrate, which is ignited by the electrical signal. The ignited propellant produces nitrogen gas for inflating a side airbag 14, which is coupled to the inflation device 18.

As illustrated in FIG. 1, the side airbag 14 is integrated within an outboard side of a vehicle seatback 20. However, it is understood that the side airbag 14 can instead be integrated within a vehicle door 22 as desired. It will also be appreciated that the airbag can be positioned or integrated within various other suitable portions of the vehicle 10.

Referring now to FIGS. 2A–2D, there are shown schematic views of an occupant, depicting the occupant being forced into a side airbag 14, according to one embodiment of the invention. Within approximately six milliseconds after impact, the crash sensors 16 determine whether a vehicle impact event has occurred. If the crash sensors 16 detect an impact, then the crash sensors 16 cause the inflation device 18 to inflate the side airbag 14. At approximately nine milliseconds after the impact, the side airbag 14 breaks out of the vehicle seatback 20 and begins to inflate. At approximately fourteen milliseconds, the airbag 14 is fully deployed and inflated. Between fourteen milliseconds and forty-five milliseconds after the impact, the inflation device 18 maintains the airbag in a fully inflated configuration at a pressure of about twenty-five to thirty psi. Thereafter, the inflation device allows nitrogen gas to be forced out of the bag as the occupant is forced into the airbag 14. It will be understood that the times described above are merely exemplary and can vary as desired.

The side airbag 14 includes a shoulder-receiving portion 24 and a thorax-receiving portion 26 extending from the shoulder-receiving portion 24. With particular attention to FIGS. 2C and 2D, it can be seen that the thorax-receiving portion 26 does not further inflate inboard or otherwise increase in thickness as the occupant's shoulder is forced into the shoulder-receiving portion 24. This feature is advantageous because it decreases the risk of the side airbag 14 contacting the occupant's thorax, deflecting the occupant's thorax inboard, and injuring the occupant.

Figure 3A:
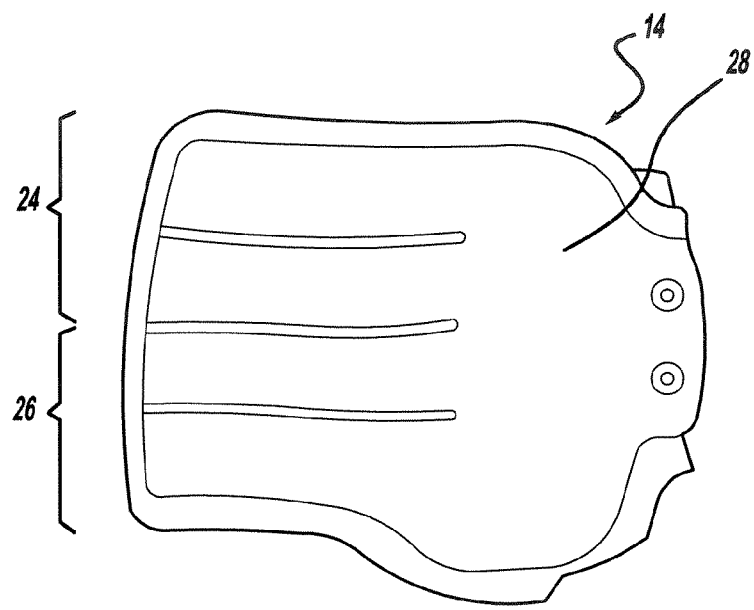
FIG. 3A is a plan view of an inflated side airbag, according to one embodiment of the present invention.
Figure 3B:
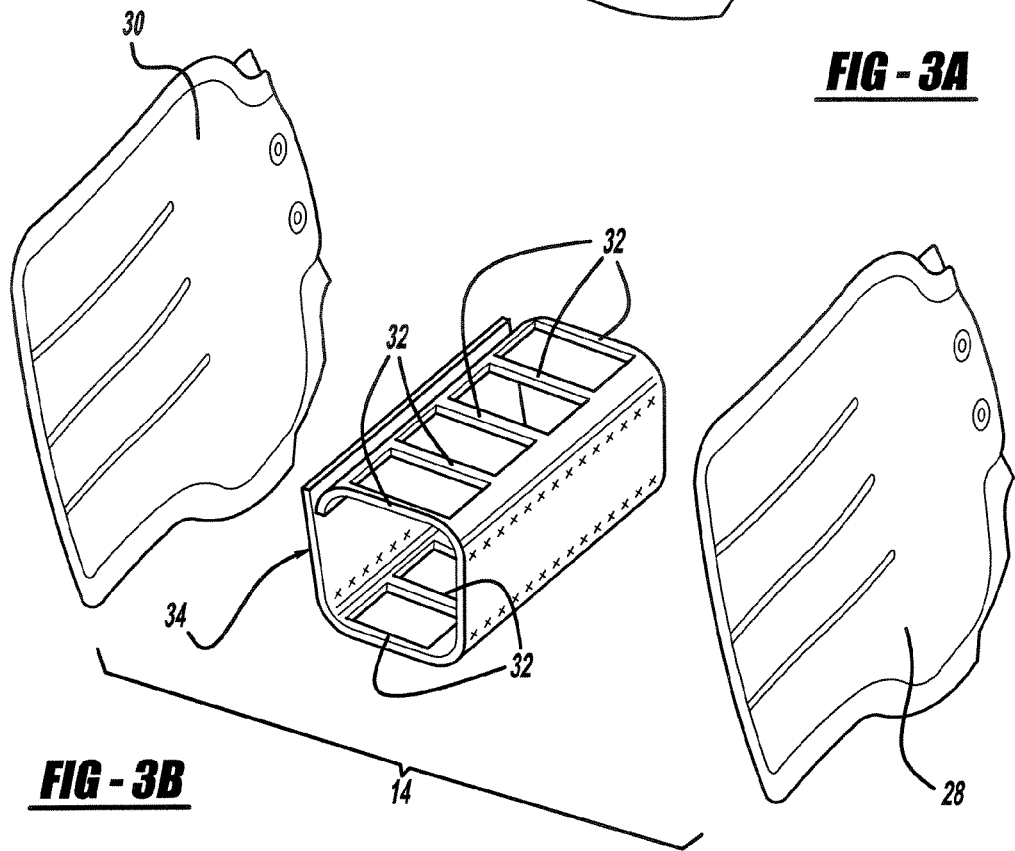
FIG. 3B is an exploded view of the inflated side airbag shown in FIG. 3A, illustrating a plurality of tethers coupled to the airbag.

Referring now to FIGS. 3A and 3B, there is shown a side airbag 14, according to one embodiment of the invention. This side airbag 14 is comprised of an inboard cloth panel 28 and an outboard cloth panel 30, which is attached to the inboard cloth panel 28. These panels 28, 30 are sewn or otherwise attached to each other along their peripheries at one or more seams 36 to form an inflatable bag. The inboard cloth panel 28 is intended to contact the occupant as he is forced into the airbag 14. The outboard cloth panel 30 is intended to contact the vehicle door 22 and receive any door intrusion.

In one embodiment, each of the panels 28, 30 have a height of approximately three hundred (300) millimeters and a width of approximately three hundred fifty (350) millimeters when the airbag 14 is flat and deflated. However, it is understood that the panels can have various other suitable dimensions as desired. Additionally, these panels 28, 30 are comprised of a 420 Dania material. Nonetheless, it is contemplated that the panels can instead be comprised of 630 Dania material or various other suitable materials as desired.

As best shown in FIGS. 3B, 4A, and 4C, the side airbag 14 further includes one or more tethers 32 having opposing ends for respectively attaching the inboard cloth panel 28 of the thorax-receiving portion 26 to the outboard cloth panel 30 of the thorax-receiving portion 26. In the embodiment shown in FIG. 3B, the tethers 32 are integral parts of a one-piece cloth panel 34. However, it is understood that the tethers can instead be individual straps with opposing ends that are respectively attached to the inboard and outboard cloth panels 28, 30.

The tethers 32 are arranged in an upper row 33 and a lower row 35. The tethers 32 in the upper row 33 are sized longer than the tethers 32 in the lower row 35. In this regard, the tethers 32 are arranged for providing an airbag with a teardrop or wedge-like cross section when the airbag is fully inflated. In addition to this arrangement, it will be appreciated that the tethers can be sized various other suitable lengths and configured in a variety of other suitable arrangements as desired.

With particular attention to FIGS. 4A and 4B, it can be seen that the tethers 32 prevent the thorax-receiving portion 26 from inflating beyond a predetermined thickness approximately equal to the length of the tethers 32. This feature prevents the thorax-receiving portion 26 of the side airbag 14 from inflating further inboard when the shoulder-receiving portion 24 is compressed by the occupant's shoulder. As a result, the occupant's shoulders can absorb a substantial portion of the vehicle impact energy before any of the energy is transferred to the occupant's thorax. In other words, the tethers 32 limit the expansion of the thorax-receiving portion 26 and protect the occupant's typically weaker thorax. In one embodiment, the occupant's thorax may contact the thorax-receiving portion 26 only after the occupant's shoulder has been forced substantially into the shoulder-receiving portion of the airbag 14.

By way of example, each of the tethers 32 in the upper row 33 may be sized about eighty (80) millimeters and the tethers in the lower row 35 can be sized about thirty (30) millimeters in length. Accordingly, the tethers 32 can limit the thickness of the thorax-receiving portion 26 when the airbag 14 is fully inflated. Moreover, the shoulder-receiving portion 24, which has no tethers coupled thereto, can inflate to a maximum thickness of approximately one hundred twenty (120) millimeters. In addition to these exemplary dimensions, it is contemplated that the tethers, the thorax-receiving portion, and the shoulder-receiving portion can be sized according to a variety of other suitable dimensions as desired.

Figure 5A:
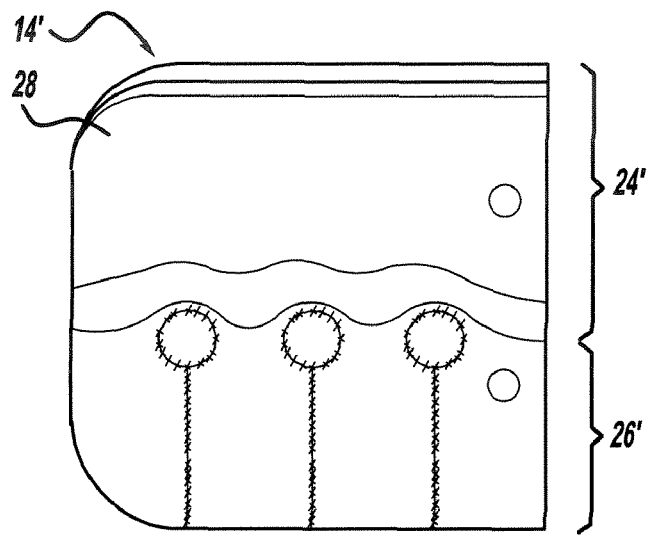
FIG. 5A is a plan view of an inflated side airbag, according to another embodiment of the present invention.
Figure 5B:
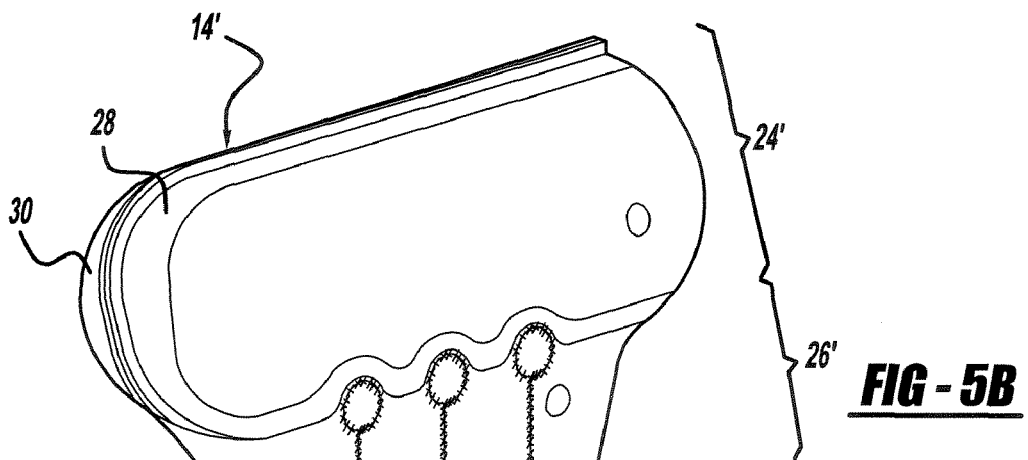
FIG. 5B is a perspective view of the inflated side airbag shown in FIG. 5A.
Figure 5C:
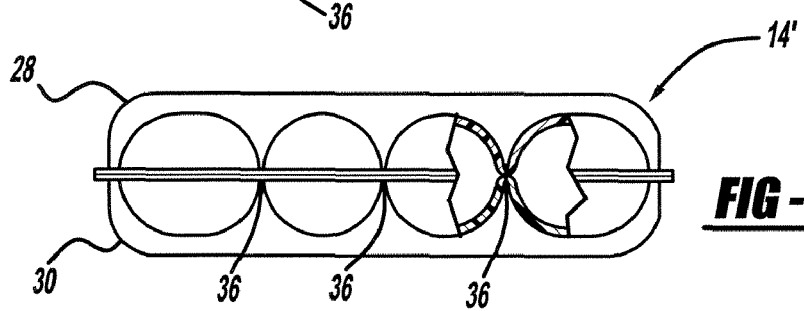
Figure 6A:
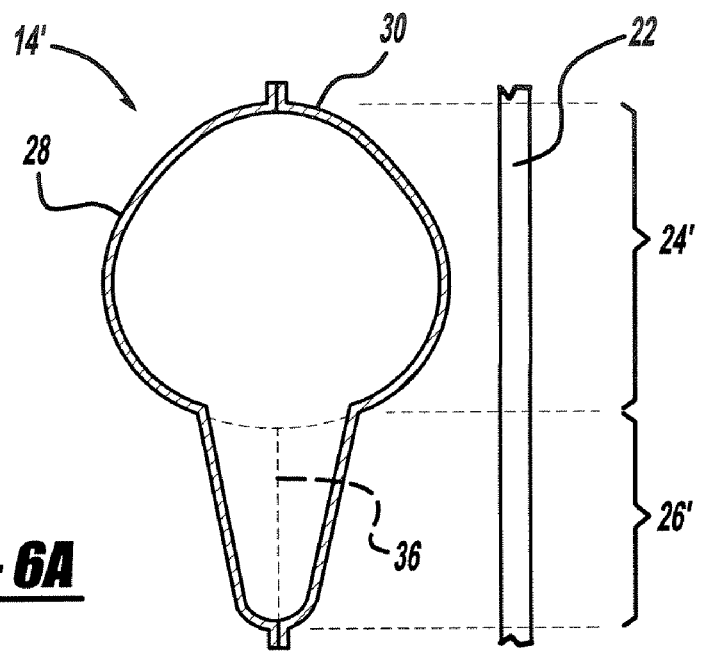
FIGS. 6A–6B are cross-sectional views of an inflated side airbag, illustrating the deformation of the airbag during a side impact event, according to another embodiment of the present invention.
Figure 6B:
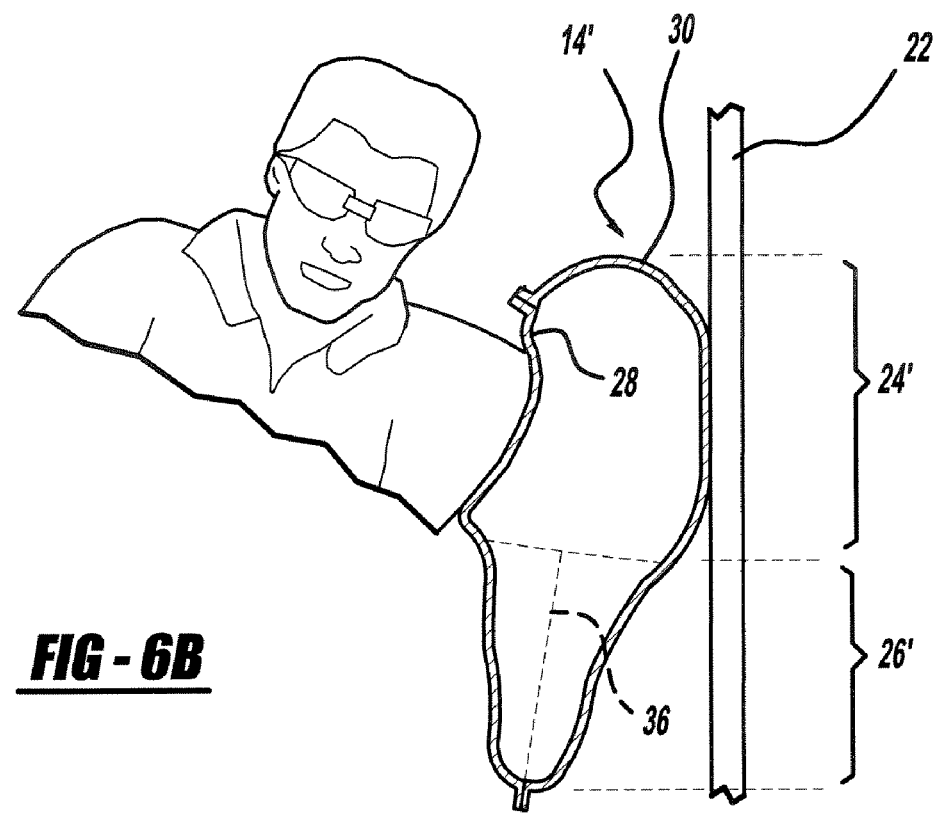

Referring now to FIGS. 5A–5C, there is shown a side airbag 14', according to another embodiment of the invention. This side airbag 14' has a shoulder-receiving portion 24 and a thorax-receiving portion 26' extending form the shoulder-receiving portion 24". The thorax-receiving portion 26' includes one or more seams 36 of stitching, which attaches the inboard cloth panel 28' directly to the outboard cloth panel 30'. As best shown in FIGS. 6A and 6B, these seams 36 are similar to the tethers 32 described in the previous embodiment in that the seams 36 limit the expansion of the thorax-receiving portion 26'. As a result, the thorax-receiving portion 26' does not contact the occupant's thorax until after the shoulder-receiving portion 24' has been substantially compressed by the occupant's shoulder. This feature is beneficial because the occupant's shoulder is stronger and better suited for receiving a substantial amount of the impact energy than the occupant's thorax. In this regard, the occupant's thorax can be pressed into the thorax-receiving portion 26' only after the shoulder has been subjected to a maximum threshold of force that may otherwise injure the occupant.

Similar to the previous example of airbag dimensions, the seams 36 can limit the thickness of the thorax-receiving portion 26' to approximately fifty (50) millimeters when the airbag 14' is inflated. Moreover, the shoulder-receiving portion 24', which is not restricted by the seams, can expand to a thickness of approximately one hundred twenty (120) millimeters.

In addition to the embodiments described herein, it is contemplated that various other constructions can provide for an airbag that retains a teardrop or wedge-like shape as the occupant's shoulder is forced into the airbag.

While particular embodiments of the invention have been shown and described, it will be understood, of course, that the invention is not limited thereto since modifications may be made by those skilled in the art, particularly in light of the foregoing teachings. Accordingly, it is intended that the invention be limited only in terms of the appended claims.

What is claimed is:

1. A side airbag for a supplemental restraint system of a vehicle, comprising:
   an inflatable bag having a shoulder-receiving portion and a thorax-receiving portion that extends from said shoulder-receiving portion;
   said inflatable bag moveable between a deflated configuration and an inflated configuration;
   said thorax-receiving portion thinner than said shoulder-receiving portion in a lateral direction when said inflatable bag is disposed in said inflated configuration and said shoulder-receiving portion is compressed.

2. The side airbag of claim 1 wherein said thorax-receiving portion has an inboard side and an outboard side with said outboard side fastened to said inboard side substantially across said thorax-receiving portion for maintaining said thorax-receiving portion thinner than said shoulder-receiving portion in said lateral direction when said inflatable bag is in disposed in said inflated configuration and said shoulder-receiving portion is compressed.

3. The side airbag of claim 1 wherein said thorax-receiving portion has an inboard side and an outboard side with at least one seam threadably attached therebetween for sizing said thorax-receiving portion thinner than said shoulder-receiving portion.

4. The side airbag of claim 3 wherein said at least one seam extends from a bottom portion of said thorax-receiving portion toward a top portion of said thorax-receiving portion.

5. The side airbag of claim 3 wherein said at least one seam terminates at an end with a circular pattern stitching for preventing said inflatable bag from tearing at said end of said at least one seam.

6. The side airbag of claim 3 wherein said inflatable bag is coupled to at least one of a vehicle seat and a vehicle door.

7. A side airbag for a supplemental restraint system of a vehicle, comprising:
   an inflatable bag having a shoulder-receiving portion and a thorax-receiving portion that extends from said shoulder-receiving portion;
   said shoulder-receiving portion and said thorax-receiving portion each having an inboard side and an outboard side; and
   at least one tether coupled to said thorax-receiving portion and in connection between said inboard side and said outboard side of said thorax-receiving portion;
   said inflatable bag moveable between a deflated configuration and an inflated configuration;
   said at least one tether maintaining said thorax-receiving portion thinner than said shoulder-receiving portion in a lateral direction when said inflatable bag is disposed in said inflated configuration and said shoulder receiving portion is compressed.

8. The side airbag of claim 7 wherein said at least one tether has an outboard end portion sewn to said outboard side of said thorax-receiving portion and an inboard end portion sewn to said inboard side of said thorax-receiving portion.

9. The side airbag of claim 7 wherein said thorax-receiving portion has an upper portion and a lower portion, said upper portion having a first plurality of tethers in connection between said inboard side and said outboard side, said lower portion having a second plurality of tethers in connection between said inboard side and said outboard side.

10. The side airbag of claim 9 wherein said first plurality of tethers are longer in length than said second plurality of tethers.

11. The side airbag of claim 10 wherein said first plurality of tethers are more than twice the length of said first plurality of tethers.

12. The side airbag of claim 9 wherein said first plurality of tethers are arranged in a row from a rear portion of said inflatable bag to a front portion of said inflatable bag.

13. The side airbag of claim 9 wherein said second plurality of tethers are arranged in a row from a rear portion of said inflatable bag to a front portion of said inflatable bag.

14. The side airbag of claim 7 wherein said inflatable bag is comprised of an inboard panel and an outboard panel that is coupled to said inboard panel.

15. The side airbag of claim 7 wherein said inboard panel and said outboard panel are each comprised of a flexible cloth.

16. The side airbag of claim 7 wherein said inflatable bag is coupled to at least one of a vehicle seat and a vehicle door.

17. A supplemental restraint system for a vehicle, comprising:
- an inflatable bag coupled to the vehicles;
- said inflatable bag having a shoulder-receiving portion and a thorax-receiving portion that extends from said shoulder-receiving portion;
- an inflation device coupled to said inflatable bag for inflating said inflatable bag; and
- a crash sensor coupled to said inflation device for detecting a vehicle impact event and actuating said inflation device to inflate said inflatable bag;
- said inflatable bag moveable between a deflated configuration and an inflated configuration;
- said thorax-receiving portion thinner than said shoulder-receiving portion in a lateral direction when said inflatable bag is disposed in said inflated configuration and said shoulder receiving portion is compressed.

18. The side airbag of claim 17 wherein said thorax-receiving portion has an inboard side and an outboard side that is fastened to said inboard side substantially across said thorax-receiving portion.

19. The side airbag of claim 18 wherein said thorax-receiving portion has an upper portion and a lower portion, said upper portion having a first plurality of tethers in connection between said inboard side and said outboard side, said lower portion having a second plurality of tethers in connection between said inboard side and said outboard side.

20. The side airbag of claim 18 wherein said thorax-receiving portion has an inboard side and an outboard side with at least one seam threadably attached therebetween for sizing said thorax-receiving portion thinner than said shoulder-receiving portion.

* * * * *